US008321862B2

(12) United States Patent
Swamy et al.

(10) Patent No.: US 8,321,862 B2
(45) Date of Patent: Nov. 27, 2012

(54) SYSTEM FOR MIGRATING A VIRTUAL MACHINE AND RESOURCE USAGE DATA TO A CHOSEN TARGET HOST BASED ON A MIGRATION POLICY

(75) Inventors: Sumedha K. Swamy, Sunnyvale, CA (US); Kais Belgaied, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 922 days.

(21) Appl. No.: 12/408,173

(22) Filed: Mar. 20, 2009

(65) Prior Publication Data
US 2010/0242045 A1     Sep. 23, 2010

(51) Int. Cl.
*G06F 9/455* (2006.01)
(52) U.S. Cl. .......................................................... 718/1
(58) Field of Classification Search ....................... 718/1
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,111,303 B2 * | 9/2006 | Macchiano et al. | 719/313 |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2003/0037154 A1 | 2/2003 | Poggio et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |

(Continued)

OTHER PUBLICATIONS

Droux, N.; "Crossbow Virtualization Architecture"; Aug. 28, 2007; Solaris Core OS, Sun Microsystems, Inc.; 51 pages.

(Continued)

*Primary Examiner* — Meng An
*Assistant Examiner* — Blake Kumabe
(74) *Attorney, Agent, or Firm* — Osha Liang LLP

(57) ABSTRACT

A method for migrating a virtual machine executing on a host. The method involves monitoring, by a monitoring agent connected to a device driver, hosts in a network, wherein the device driver is connected to a network interface card, determining a virtual machine to be migrated based on a virtual machine policy, sending, by the host, a request to migrate to at least one of a plurality of target hosts in the network, receiving an acceptance to the request to migrate from at least one of the plurality of target hosts, determining, by the monitoring agent, a chosen target host to receive the virtual machine based on a migration policy, wherein the chosen target host is one of the at least one target hosts that sent the acceptance, sending a confirmation and historical information to the chosen target host, and migrating the virtual machine to the chosen target host.

20 Claims, 7 Drawing Sheets

U.S. PATENT DOCUMENTS

| | | | |
|---|---|---|---|
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0174324 | A1 | 8/2006 | Zur et al. |
| 2007/0283348 | A1* | 12/2007 | White ................................ 718/1 |
| 2010/0191854 | A1* | 7/2010 | Isci et al. ...................... 709/226 |

OTHER PUBLICATIONS

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

* cited by examiner

SYSTEM FOR MIGRATING A VIRTUAL MACHINE AND RESOURCE USAGE DATA TO A CHOSEN TARGET HOST BASED ON A MIGRATION POLICY

BACKGROUND

Traditional computer systems are designed with applications executing in an environment specified by an operating system. The operating system in turn executes directly on hardware. In order to use devices in the hardware, an operating system installs a corresponding device driver. Thus, when applications want to use the device, the operating system uses the device driver to communicate with the device.

Advances in computer science have led to the virtualization of hardware. Specifically, rather than an operating system directly using resources of hardware, the operating system executes in a virtual environment with virtual hardware resources. One such virtual environment is created by the use of domains (or other similar virtualization technology). Domains provide a method for containment of software and a separation of software from hardware. For example, a domain may be used to prevent software failures from causing another failure in the system. Thus, in a virtualized environment, applications execute in an environment created by the operating system. Specifically when using domains, applications execute on virtual hardware resources provided by a guest domain.

Platform virtualization is the process in which a host ("host") may execute virtual machines that simulate computer hardware for one or more guest domains ("guests"). Each guest is delegated a subset of the simulated hardware resources managed by the host. For example, a host managing dual processors may assign one of the processors to be used exclusively by a guest. Platform virtualization allows for improved management of information technology infrastructure. More specifically, platform virtualization maximizes hardware resource utilization and reduces operating costs.

Another configuration involving virtualization involves physical computer systems that include virtual machines that are configured to interact with a network (i.e., communicate with other physical computers and/or virtual machines in the network). Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Hardware resources like NICs, memory, and CPUs are generally bound to a physical unit (i.e., a server) and the virtual machines executing on that unit are limited to the resources available on the unit. When a virtual machine demands more resources than is available on the unit upon which it is executing, a method for allowing the virtual machine to migrate to a unit with more resources available with minimal impact to the applications that are executing on the virtual machine is required.

SUMMARY

In general, in one aspect, the invention relates to a method for migrating at least one of a plurality of virtual machines executing on a host, comprising monitoring, by a monitoring agent operatively connected to a device driver, a plurality of hosts in a network, wherein the device driver is operatively connected to a network interface card, determining a virtual machine of the plurality of virtual machines to be migrated based on a virtual machine policy, wherein the virtual machine is operatively connected to the device driver, sending, by the host, a request to migrate to at least one of a plurality of target hosts in the network, receiving an acceptance to the request to migrate from at least one of the plurality of target hosts, determining, by the monitoring agent, a chosen target host to receive the virtual machine based on a migration policy, wherein the chosen target host is one of the at least one of the plurality of target hosts from which the acceptance was received, sending a confirmation message to the chosen target host, sending historical information to the chosen target host, and migrating the virtual machine to the chosen target host.

In general, in one aspect, the invention relates to a host comprising, a processor, a monitoring agent executing on host, a device driver configured to interface with the network interface card operatively connected to the host, memory comprising instructions, which when executed by the processor perform a method, the method comprising monitoring, by the monitoring agent operatively connected to a device driver, a plurality of hosts in a network, wherein the device driver is operatively connected to the network interface card, wherein the host is in the network, determining a virtual machine of the plurality of virtual machines executing on the host to be migrated based on a virtual machine policy, wherein the virtual machine is operatively connected to the device driver, sending, by the host, a request to migrate to at least one of a plurality of target hosts in the network, receiving an acceptance to the request to migrate from at least one of the plurality of target hosts, determining, by the monitoring agent, a chosen target host to receive the virtual machine based on a migration policy, wherein the chosen target host is one of the at least one of the plurality of target hosts from which the acceptance was received, sending a confirmation message to the chosen target host, sending historical information to the chosen target host, and migrating the virtual machine to the chosen target host.

In general, in one aspect, the invention relates to a computer readable medium comprising executable instructions executable by a processor to perform a method, the method comprising, monitoring, by a monitoring agent operatively connected to a device driver, a plurality of hosts in a network, wherein the device driver is operatively connected to a network interface card, determining a virtual machine of the plurality of virtual machines to be migrated based on a virtual machine policy, wherein the virtual machine is operatively connected to the device driver, sending, by the host, a request to migrate to at least one of a plurality of target hosts in the network, receiving an acceptance to the request to migrate from at least one of the plurality of target hosts, determining, by the monitoring agent, a chosen target host to receive the virtual machine based on a migration policy, wherein the chosen target host is one of the at least one of the plurality of target hosts from which the acceptance was received, sending a confirmation message to the chosen target host, sending historical information to the chosen target host, and migrating the virtual machine to the chosen target host.

DETAILED DESCRIPTION

Figure 1:
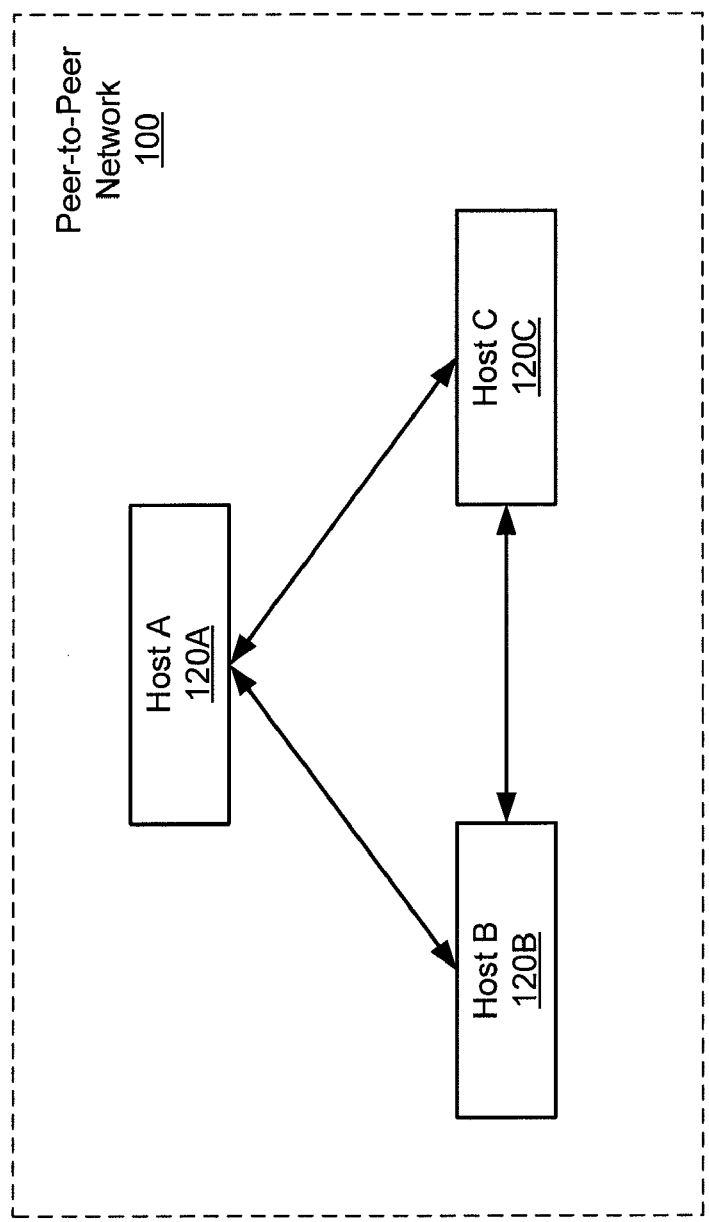
FIG. 1 shows a distributed network in accordance with one or more embodiments of the invention.

Specific embodiments of the invention will now be described in detail with reference to the accompanying figures (also denoted by FIG.). Like elements in the various figures are denoted by like reference numerals for consistency.

In the following detailed description of embodiments of the invention, numerous specific details are set forth in order to provide a more thorough understanding of the invention. However it will be apparent to one of ordinary skill in the art that the invention may be practiced without these specific details. In other instances, well-known features have not been described in detail to avoid unnecessarily complicating the description.

In general, embodiments of the invention provide a method and system for allocating a distributed resource. Specifically, in one or more embodiments of the invention, a monitoring agent residing in a host monitors resource allocation in a distributed network to determine an appropriate target host for migrating a virtual machine.

FIG. 1 shows a distributed network according to one or more embodiments of the invention. Specifically, the distributed network is a peer-to-peer network (100) including one or more hosts (120A, 120B, 120C) that communicate over a network (not shown). In one embodiment of the invention, the network may correspond to a local area network (LAN), a wide area network (WAN), the Internet, or any combination thereof. The network provides a medium over which client requests (in the form of packets) for applications and/or services executing on the hosts (120A, 120B, 120C) are communicated.

Figure 2:
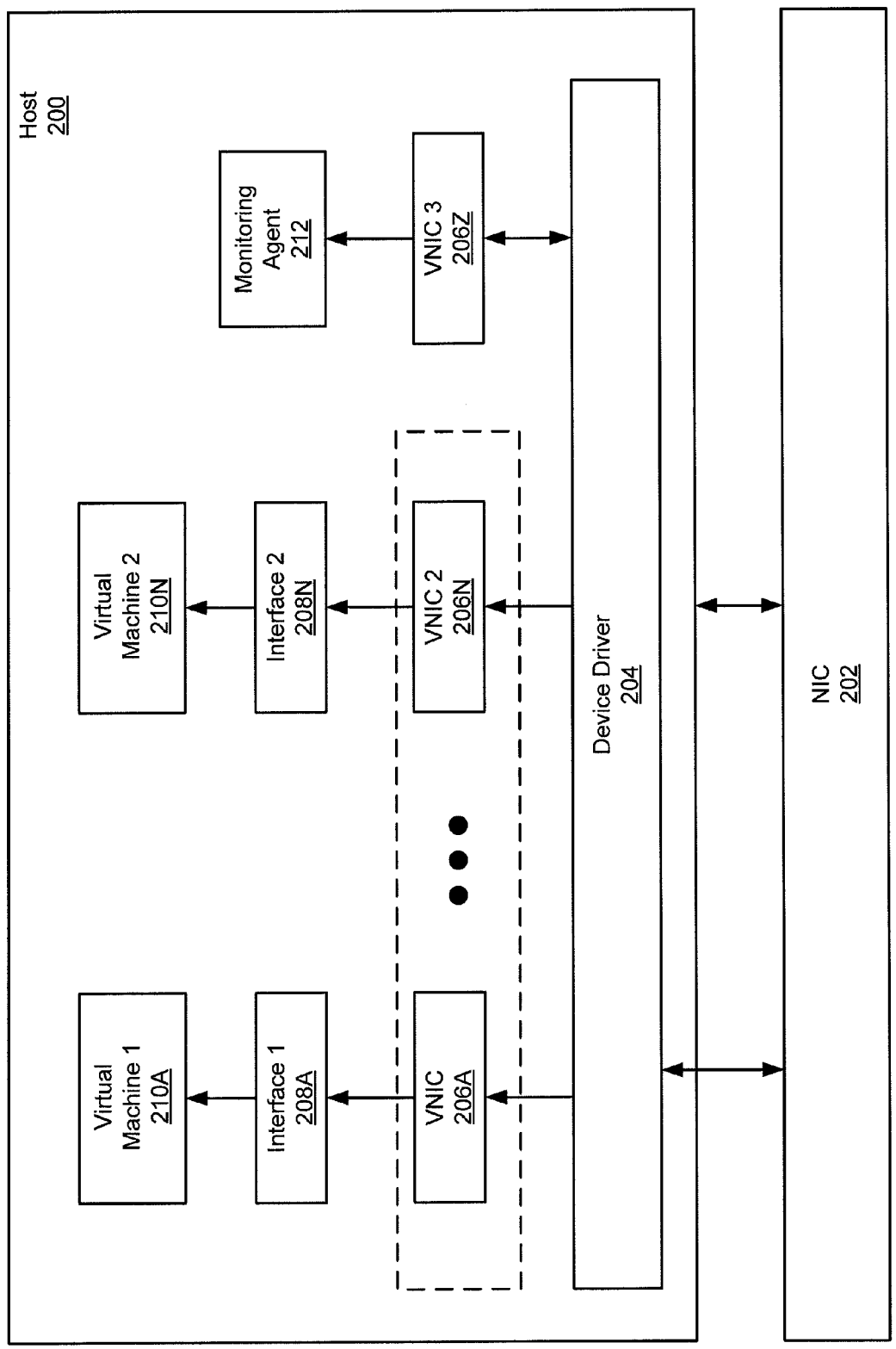
FIG. 2 shows a system in accordance with one or more embodiments of the invention.

FIG. 2 shows a system in accordance with one or more embodiments of the invention. The system includes a host (200), at least one physical NIC (202), at least one device driver (204), at least one virtual network interface card (VNIC) (206A, 206N, 206Z), at least one interface (208A, 208N), at least one virtual machine (210A-210N), and a monitoring agent (212). Each of these components is described below.

The host (200) is operatively connected to the physical NIC (202). More specifically, the physical NIC (202) is operatively connected to a device driver (204) in the host (200). In one or more embodiments of the invention, the host (200) may be a part of a peer-to-peer network that includes multiple hosts. The physical NIC (202) provides an interface between the host (200) and a network (not shown). More specifically, the physical NIC (202) includes a physical interface (e.g., an Ethernet Interface) configured to send packets to and receive packets from a network. In one embodiment of the invention, the network may correspond to a local area network (LAN), a wide area network (WAN), the Internet, or any combination thereof. The network and physical NIC (202) may be connected using a wired connection or a wireless connection.

In one embodiment of the invention, the device driver (204) provides an interface between the physical NIC (202) and the VNICs (206A, 206N, 206Z). Specifically, the device driver (204) includes functionality to send and receive packets to and from the VNICs (206A, 206N, 206Z) and the physical NIC (202). The VNICs (206A, 206N, 206Z) provide a layer of abstraction between a physical NIC and virtual machines. Specifically, VNICs (206A, 206N, 206Z) operate like a physical NIC. To virtual machines (e.g., 210A, 210N), VNICs appear as physical NICs. In one or more embodiments of the invention, the use of VNICs (206A, 206N, 206Z) allows an arbitrary number of virtual machines to share the host's networking functionality. Further, in one or more embodiments of the invention, each virtual machine (210A, 210N) may be associated with an arbitrary number of VNICs (206A, 206N, 206Z), thereby providing increased flexibility in the types of networking functionalities available to the virtual machines and/or virtual execution environments. For example, a virtual machine (210A, 210N) may use one VNIC (206A, 206N, 206Z) for incoming network traffic, and another VNIC (206A, 206N, 206Z) for outgoing network traffic.

In one embodiment of the invention, each of the VNICs (206A, 206N, 206Z) is located in the Media Access Control (MAC) layer of the host (200). Further, each of the VNICs (206A, 206N, 206Z) is associated with an Internet Protocol (IP) address. Further, in one embodiment of the invention, there is different IP address for each VNIC on the host (200).

The virtual machines (210A, 210N) are distinct operating environments which may include all or a subset of the functionality of the host system (200) via an abstraction layer. In one embodiment of the invention, the VNICs (206A, 206N) are operatively connected to virtual machines (210A, 210N) via an interface (208A, 208N), which provides a communication path between the processes in the virtual machines and the processes in the host. In one or more embodiments of the invention, each virtual machine (210A, 210N) includes a separate instance of an operating system. Many different types of virtual machines (210A, 210N) exist, with each type offering different functionality. In one or more embodiments of the invention, the virtual machines inherit network connectivity from the host (200) via VNICs (e.g., VNIC 1 (206A), VNIC 2 (206N)).

In one embodiment of the invention, a VNIC (206Z) connects the device driver (204) to a monitoring agent (212). Those skilled in the art will appreciate that the monitoring agent (212) may be operatively connected to the device driver (204) using a physical NIC. In one embodiment of the invention, the monitoring agent (212) monitors the host's (200) resource usage and determines where virtual machines (210A and 210N) should be hosted. More specifically, the monitoring agent determines whether a virtual machine should be migrated to a different host, and determines to which target host the virtual machine migrates. The functionality of the monitoring agent is described below.

Figure 3:
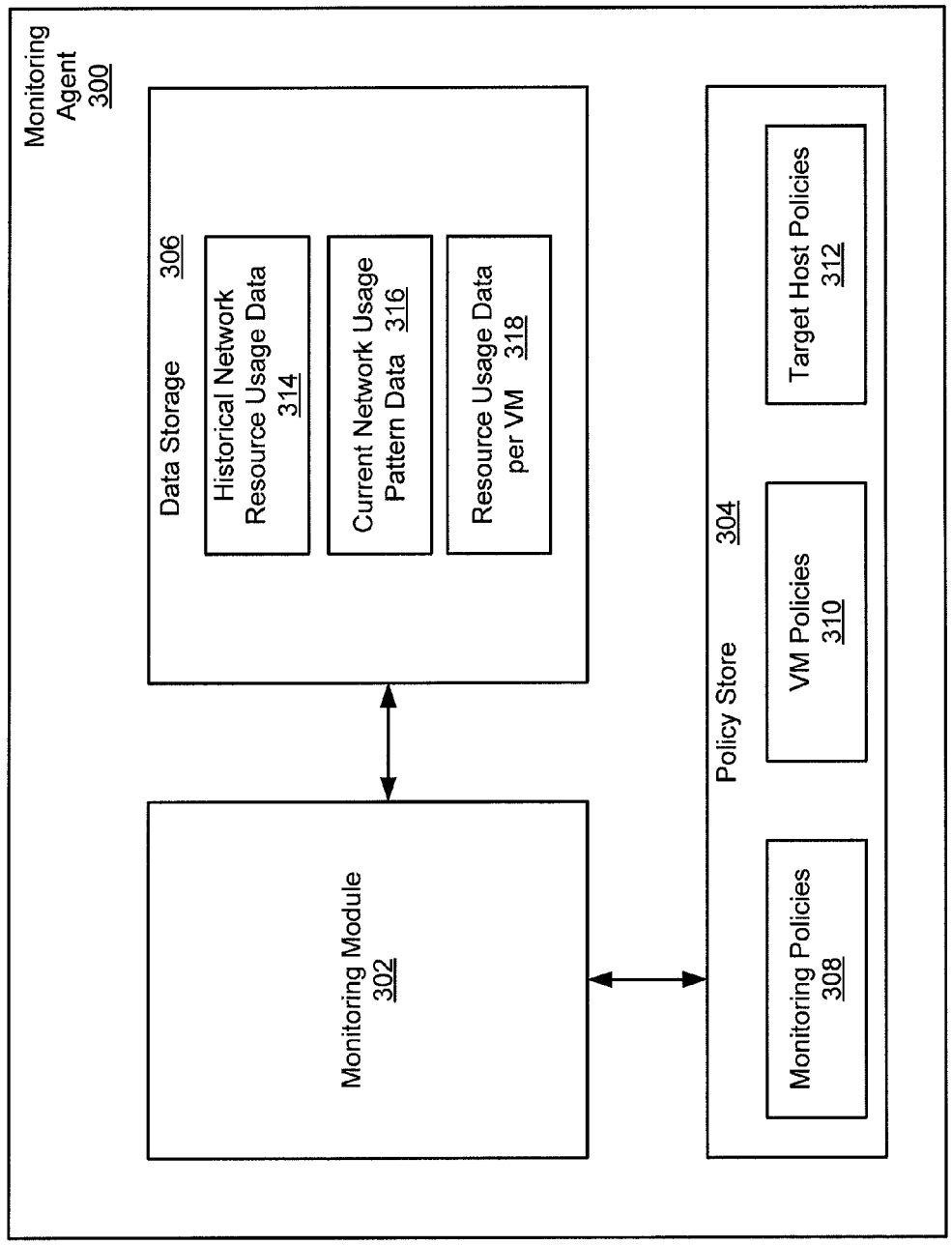
FIG. 3 shows a monitoring agent in accordance with one or more embodiments of the invention.

FIG. 3 shows a monitoring agent (300) in accordance to one or more embodiments of the invention. Specifically, FIG. 3 shows an expanded view of the monitoring agent (212) of FIG. 2. The monitoring agent (300) includes a monitoring module (302), a policy store (304) and data storage (306). Each of the aforementioned components of the monitoring agent are described below.

The monitoring module (302) is operatively connected to the policy store (304) and includes functionality to implement policies stored in the policy store (304). The policy store (304) is configured to store a plurality of policies including monitoring policies (308), virtual machine (VM) policies (310), and target host policies (312). Examples of monitoring policies (308) include, but are not limited to, a policy to monitor when a specific time interval is reached, a policy to monitor when a particular event occurs, such as peak resource usage, and/or a policy to monitor when the host system changes in a specified way, such as when a virtual machine in migrated from the host. Virtual machine policies (310) determine whether a virtual machine is to be migrated to a different host. Examples of virtual machine policies (310) include, but are not limited to, meeting a preset resource threshold, and migrating a virtual machine that is predicted to use the most network resources in a specified future duration of time. The amount of network resources predicted to be used by a migrating virtual machine may be pre-determined, bounded by particular minimum and/or maximum limits, etc. Examples of target host policies (312) include, but are not limited to, a host with the greatest predicted resources available and a host having a specified margin of available resources above the maximum predicted network resource usage.

The data storage (306) stores resource and network metadata including historical network resource usage data (314), current network usage pattern data (316), and resource usage data per virtual machine (318).

In one embodiment of the invention, the historical network resource usage data (314) corresponds to the number of packets sent/received (or bytes sent/received) by the host over a period of time. Further, the historical network resource usage data (314) may further specify types of packets based on protocols (TCP, UDP, etc.) or based on another classification scheme. In addition, the historical network resource usage data (314) may also include the historical size of packets sent/received over the period of time. Those skilled in the art will appreciate that the historical network resource usage data (314) is not limited to the examples above.

In one embodiment of the invention, the current network usage pattern data (316) specifies the fluctuations in network usage (e.g., packets sent/received, bytes sent/received) by the host for the current configuration of the host. For example, the current network usage pattern (316) may show trends with respect to high and low network usage over a given day (or other finite period of time). Those skilled in the art will appreciate that the current network usage pattern data (316) is not limited to the examples above.

In one embodiment of the invention, resource usage data per virtual machine (318) corresponds to the number of packets sent/received (or bytes sent/received) by a given virtual machine over a period of time. Further, the resource usage data per virtual machine (318) may further specify types of packets based on protocols (TCP, UDP, etc.) or based on another classification scheme. Those skilled in the art will appreciate that the resource usage data per virtual machine (318) is not limited to the examples above.

In one embodiment of the invention, the monitoring module (302) includes functionality to query the individual VNICs (206A and 206N) for the resource usage of each virtual machine (210A and 210N). Resource usage may be represented as bytes in and bytes out over a period of time. Those skilled in the art will appreciate that other metrics for tracking resource usage may be used, such as, number of packets sent/received over a period of time. In one or more embodiments of the invention, the monitoring module (302) determines whether to multicast resource data packets to the other hosts in the network. If resource data packets are to be multicasted, then the monitoring module (302) issues multicast packets that include (among other data) the resource usage data per virtual machine (318). In one or more embodiments of the invention, the content of the aforementioned multicast packets are specified by monitoring policies (308) stored in the policy store (304) and implemented by the monitoring module (302).

In one or more embodiments of the invention, the monitoring module (302) also includes functionality to determine whether a virtual machine should be migrated and which virtual machine to migrate. Those skilled in the art will appreciate that the monitoring module (302) may determine to provide a virtual machine with additional resources instead of migrating the virtual machine. Virtual machine policies (310) are used as the basis for determining whether a virtual machine is migrated and which of several virtual machines is migrated.

Continuing with the discussion of FIG. 3, in one embodiment of the invention, the monitoring module (302) includes functionality to use different algorithms to determine whether to migrate a virtual machine and which virtual machine to migrate. Specifically, the monitoring module (302) may use data stored in the data storage (306) to perform algorithmic functions. For example, when the decision to migrate a virtual machine is based on a policy of migrating the virtual machine predicted to use the maximum network resources in a specified future duration of time, such a policy may be implemented using data stored in the data storage (306). Specifically, data such as resource usage data per virtual machine, the current network usage pattern, and historical network resource usage information may be used to determine whether a particular virtual machine is predicted to use the maximum network resources.

Examples of algorithms the monitoring module may use to predict which of the virtual machines will have the high network usage in the future and then use this information to select a virtual machine to migrate. The algorithms may take into account (i) real-time traffic patterns (ii) time between migrations, (iii) reliability of predicted maximum network usage, (iv) historical data of target hosts denying migration requests, (v) reliability of host to provide historical information, (vi) historical data of resource usage by a particular VM, and (vii) frequency of multicasting monitoring data. Further, the algorithms may use mathematical constructs/functions such as weighted averages, regression analysis, and reinforcement learning.

In one or more embodiments of the invention, the monitoring module (302) includes functionality to determine the target host machine to which a virtual machine migrates. In one embodiment of the invention, a target policy is used as the basis for determining the target host. In one or more embodiments of the invention, multiple target hosts may be identified.

Figure 4:
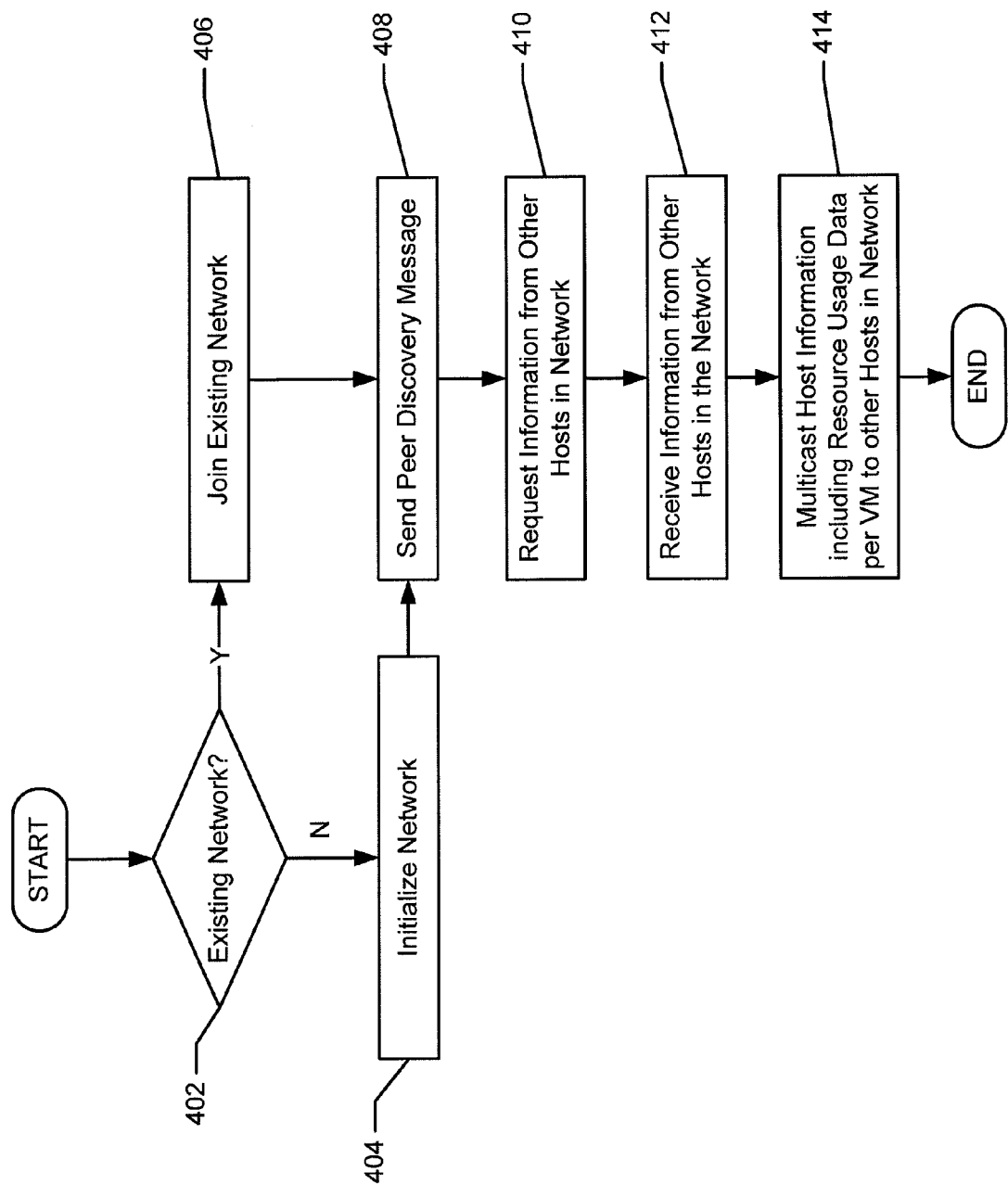
FIGS. 4 and 5 show flow charts in accordance with one or more embodiments of the invention.

FIG. 4 shows a flowchart for peer monitoring in a network in accordance with one or more embodiments of the invention. While the various steps in FIG. 4 are presented and described sequentially, one of ordinary skill will appreciate that some or all of the steps may be executed in different orders, may be combined or omitted, and some or all of the steps may be executed in parallel.

At 400, when a host is ready to be a part of a peer-to-peer network, the host determines whether the host is the first host on the network, or if there is an existing network in place. If the host is the first host on the network, at 404, the host initializes a network. At 406, when the host has determined that there is an existing network, the host joins the existing network. At 408, the host sends a peer discovery message. The peer discovery message is a message that is sent periodically by each host that allows the discovery of new hosts that have joined the network. Further, peer discovery messages may also be used to obtain information about other hosts that are connected to the network. In one or more embodiments of the invention, policies may be defined that limit the number of messages being sent, responses received, and the method in which peers are discovered. For example, a policy may be defined in which a single host is chosen for every subnet in the network, and the chosen host provides information about the peers in that host's subnet. This may be a policy used for large networks that include many subnets. In an alternative embodiment, a host receiving a peer discovery message may inform the requesting host of not only its own presence on the network, but also the presence of all the other hosts of which the receiving host is aware. In one or more embodiments of the invention, regardless of the policy used to discover new hosts on a network, the process of discovering peers achieves the objective of every peer being aware of every other peer in any network.

At 410, the host requests information from other hosts in the network. In the alternative, each host may continuously advertises its own capabilities across the peer-to-peer network. All information exchanged on the peer-to-peer network may be facilitated using well-known standard formats, and are encoded in an interchangeable form such as Extensible Mark-up Language (XML).

Continuing with FIG. 4, at 412, the host receives information from other hosts in the network, in response to the request sent at 410. In one embodiment of the invention, the information received from the other hosts in the network may include total network capacity available, current CPU utilization, memory available, current network resource usage, historical network usage data, and current network usage pattern. The host that receives information from other hosts updates its local copy of information about the sending host.

In one or more embodiments of the invention, a host may make a decision to update other hosts in the network with information when the sending host determines that the system status has changed reasonably enough to inform the peers on the network. In such cases, at 414, the host multicasts information about itself to other hosts in the network. In one embodiment of the invention, the host information includes resource usage data per virtual machine, resource availability, and any other information suited to determine whether a virtual machine should be migrated to a particular host in the network. In one embodiment of the invention, the host continues to multicast information about itself periodically so that every other host in the network continues to receive the host information.

Figure 5:
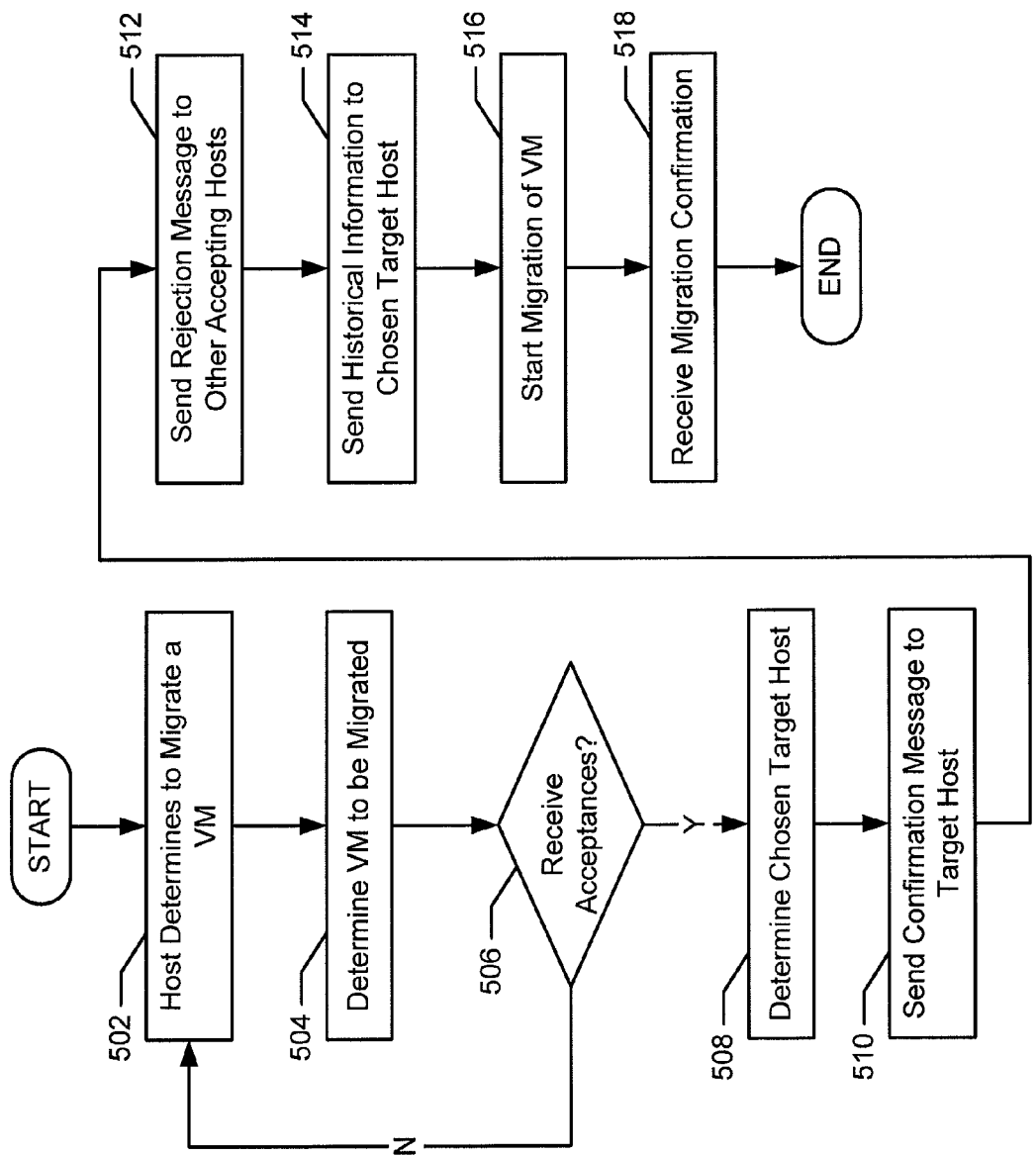

FIG. 5 shows a flowchart for migrating a virtual machine from a host to a chosen target host. While the various steps in FIG. 5 are presented and described sequentially, one of ordinary skill will appreciate that some or all of the steps may be executed in different orders, may be combined or omitted, and some or all of the steps may be executed in parallel.

At 502, the host determines to migrate a virtual machine based on one or more virtual machine policies. More specifically, every host continuously monitors consumption and availability of its resources. When a certain level of consumption (as defined by a policy) is reached, the host attempts to take suitable action in order to achieve an objective outlined by the virtual machine (or another) policy. For example, objectives defined by virtual machine (or other another) policy may be (i) use minimum possible power in order to keep the virtual machines operational; (ii) maximize resource utilization; (iii) handle resource demand variations in order to maximize the quality of service, etc. One of the actions that may be taken by a host to achieve one or more of the aforementioned objectives may be to migrate a virtual machine to a host with higher/lower resource capacity as appropriate.

At 504, the host determines which of several virtual machines executing on the host is to be migrated. The virtual machine to be migrated is chosen based on defined policies. For example, in one or more embodiments of the invention, a policy may define that the virtual machine that is most likely to use the maximum networking resources in the duration of a specified future time window is to be migrated. In such cases, an algorithm may be used to predict the network resource demand for each virtual machine using, for example, data in the data storage of the monitoring agent on the host.

The host subsequently send a request to migrate using multicast (or broadcast) messages (not shown). At 506, a determination is made as to whether the host receives acceptances from potential target hosts in the network. In order to migrate a virtual machine to a chosen target host, the target host is required to approve such an action before the migration process begins. In one or more embodiments of the invention, if no acceptances are received, the process returns back to 502, where the host chooses a different virtual machine to migrate.

At 508, the host determines the chosen target host to receive the migrating virtual machine. The target host is chosen, again, based on defined policies. For example, a policy may state that the destination host must have a specified percentage of resources greater than the maximum resource usage predicted. The peer information collected by the migrating host is consulted to determine a target host that matches the criteria defined by the policy. At 510, the host sends a confirmation message to the chosen target host. At 512, the host sends rejection messages to the potential target hosts that were not chosen to receive the migrating virtual machine. At 514, the host sends historical information about the migrating virtual machine to the chosen target host. At 516, the host starts migration of the virtual machine to the chosen target host. At 518, the host receives a migration confirmation message from the chosen target host.

Figure 6:
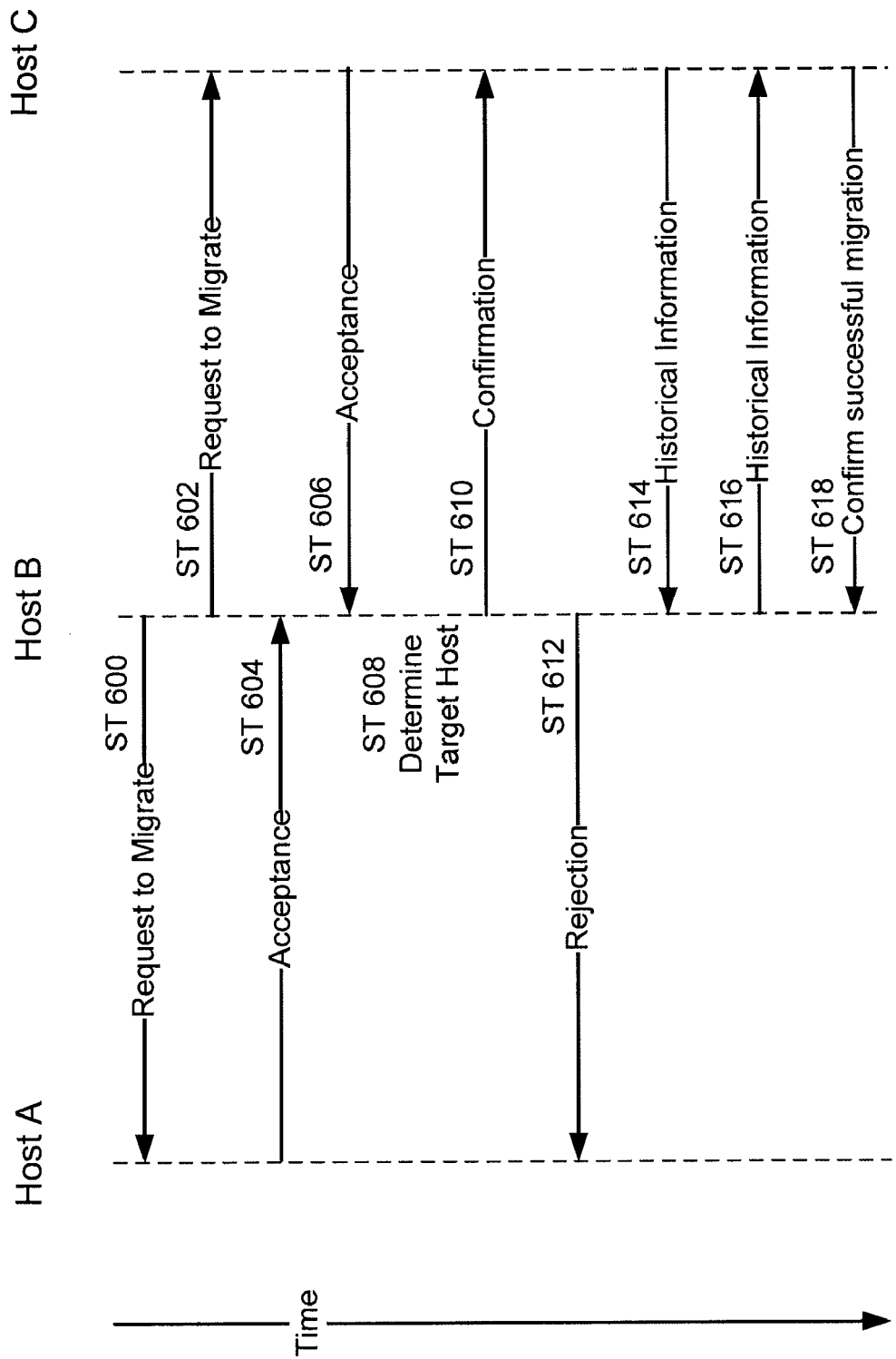
FIG. 6 shows an example in accordance with one or more embodiments of the invention.

FIG. 6 shows an example in accordance with one or more embodiments of the invention. More specifically, FIG. 6 shows a flow diagram of migrating a virtual machine from a current host to a target host.

Turning to the example, consider the scenario in which there are three hosts (Host A, Host B, and Host C) existing in a peer-to-peer network. Host B has decided to migrate a virtual machine on the basis of predicted resource demand. Hosts A and C are target hosts of the migrating virtual machine.

At ST 600, Host B sends a request to migrate a virtual machine to Host A. Assume for purposes of this example that Host B has already chosen one of several VMs executing on Host B to be migrated. Such a determine is made by Host B based on policies such as those described above. At ST 602, Host B sends a request to migrate to Host C. In one or more embodiments of the invention ST 600 and ST 602 may be performed simultaneously. Upon receipt of the request to migrate, Host A performs a resource check to determine whether it is feasible to receive a virtual machine from Host B. Host A determines that it is feasible to receive a virtual machine from Host B. Host C also performs a resource check. Host C also determines that it may receive the virtual machine from Host B.

At ST 604, Host A sends an acceptance to Host B. At ST 606, Host C sends a acceptance to Host B. In this scenario, Host B receives multiple acceptances. Accordingly, Host B must choose one of the target hosts, Host A or Host C, to receive the virtual machine. At ST 608, Host B determines the chosen target host. The host may choose one of the target hosts based one or more policies discussed above. For the purposes of this scenario, let us assume that Host C is chosen. At ST 610, Host B sends a confirmation message to the chosen target host, Host C. At ST 612, Host B sends a rejection message to Host A, which had accepted the request to migrate.

At ST 614, upon receiving the confirmation message, Host C sends a request for historical information from Host B. At ST 616, Host B sends the historical information to the chosen target host, Host C. Upon receiving the historical information from Host B, Host C confirms readiness for migration. At ST 618, Host C sends confirmation of a successful migration of the virtual machine to Host B.

Those skilled in the art will appreciate that the above implementation is only an example of one embodiment of the invention and is not intended to limit the scope of the invention. Further, those skilled in the art will appreciate that while embodiments of the invention were described with respect to peer-to-peer networks, embodiments of the invention may be implemented on other types of networks.

Figure 7:
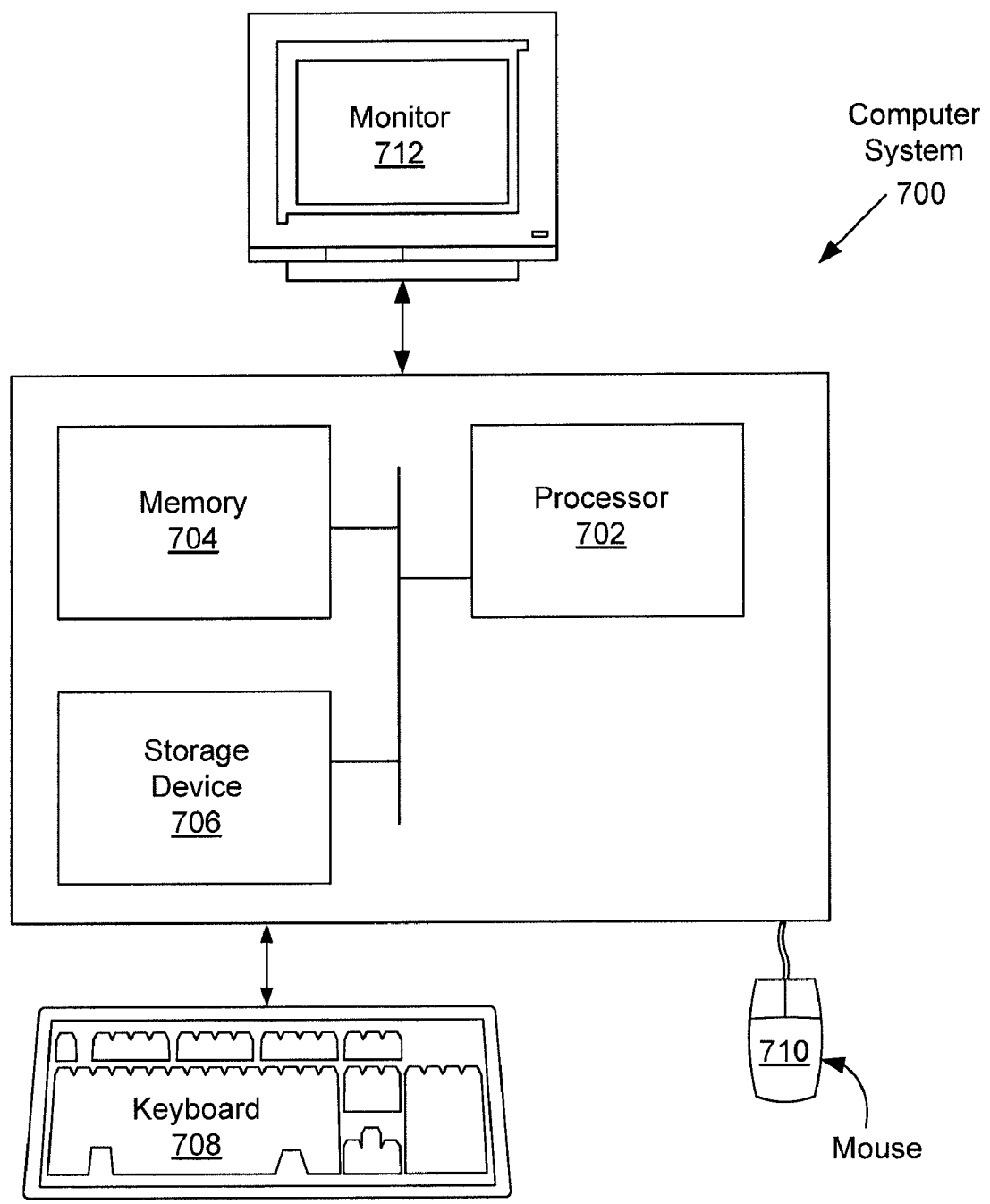
FIG. 7 shows a computer system in accordance with one or more embodiments of the invention.

Embodiments of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms, now known or later developed. Further, those skilled in the art will appreciate that one or more elements of the aforementioned computer (700) may connect to the other elements over a network. Further, software instructions to perform embodiments of the invention may be stored on a tangible computer readable medium such as a compact disc (CD), a diskette, a tape, or any other tangible computer readable storage device, now known or later developed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for migrating at least one of a plurality of virtual machines executing on a host, comprising:
   monitoring, by a monitoring agent operatively connected to a device driver, a plurality of potential target hosts in a network, wherein the device driver is executing on the host and is operatively connected to a network interface card and wherein the monitoring agent is executing on the host;
   determining, by the host, a virtual machine of the plurality of virtual machines to be migrated based on a virtual machine policy, wherein the virtual machine is operatively connected to the device driver;
   sending, by the host, a request to migrate the virtual machine to the plurality of target hosts in the network, wherein the request is sent to the plurality of potential target hosts using at least one selected from a group consisting of multicast messages and broadcast messages;
   receiving an acceptance to the request to migrate the virtual machine from at least two of the plurality of potential target hosts;
   determining, by the monitoring agent, a chosen target host to receive the virtual machine based on a migration policy, wherein the chosen target host is one of the at least two of the plurality of potential target hosts from which the acceptance was received;
   sending, by the host, a confirmation message to the chosen target host;
   sending, by the host, resource usage data for the virtual machine to the chosen target host, wherein the resource usage data for the virtual machine comprises at least one selected from a group consisting of a number of packets sent by the virtual machine over a period of time when the virtual machine was executing on the host and a number of packets received by the virtual machine over the period of time when the virtual machine was executing on the host wherein the chosen target host confirms readiness for migration upon receiving the resource usage data; and
   migrating the virtual machine to the chosen target host.

2. The method of claim 1, further comprising:
   sending a rejection message to each of the plurality of potential target hosts from which the acceptance was received and that was not selected as the chosen target host.

3. The method of claim 1, wherein the network is a peer-to-peer network.

4. The method of claim 1, wherein monitoring the plurality of hosts in the network, further comprises:
   determining to send host information to at least one of the plurality of hosts in the network based on a monitoring policy; and
   sending the host information to the at least one of the plurality of hosts in the network.

5. The method of claim 1, wherein the virtual machine policy is used to determine the most likely virtual machine on the host to use a pre-determined amount of networking resources in a specified duration of time.

6. The method of claim 1, wherein determining the virtual machine to migrate comprises using an algorithm that takes into account predicted network resource demand of the plurality of virtual machines.

7. The method of claim 6, wherein the algorithm further takes into account at least one selected from a group consisting of time between migrations, the resource usage data for the virtual machine, and historical data of the plurality of potential target hosts denying migration requests.

8. The method of claim 6, wherein determining the virtual machine comprises using an algorithm that takes into account current network usage pattern of the host.

9. A host comprising:
   a processor;
   a monitoring agent executing on host;
   a device driver configured to interface with the network interface card operatively connected to the host;
   memory comprising instructions, which when executed by the processor perform a method, the method comprising:
      monitoring, by the monitoring agent operatively connected to the device driver, a plurality of hosts in a network, wherein the device driver is operatively connected to the network interface card, wherein the host is in the network;
      determining a virtual machine of the plurality of virtual machines executing on the host to be migrated based on a virtual machine policy, wherein the virtual machine is operatively connected to the device driver;
      sending, by the host, a request to migrate the virtual machine to the plurality of potential target hosts in the network, wherein the request is sent to the plurality of potential target hosts using at least one selected from a group consisting of multicast messages and broadcast messages;

receiving an acceptance to the request to migrate the virtual machine from at least two of the plurality of potential target hosts;

determining, by the monitoring agent, a chosen target host to receive the virtual machine based on a migration policy, wherein the chosen target host is one of the at least two of the plurality of potential target hosts from which the acceptance was received;

sending, by the host, a confirmation message to the chosen target host;

sending, by the host, resource usage data for the virtual machine to the chosen target host, wherein the resource usage data for the virtual machine comprises at least one selected from a group consisting of a number of packets sent by the virtual machine over a period of time when the virtual machine was executing on the host and a number of packets received by the virtual machine over the period of time when the virtual machine was executing on the host wherein the chosen target host confirms readiness for migration upon receiving the resource usage data; and migrating the virtual machine to the chosen target host.

10. The system of claim 9, wherein the network is a peer-to-peer network.

11. The system of claim 9, wherein monitoring the plurality of hosts in the network, further comprises:

determining to send host information to the at least one of the plurality of hosts in the network based on a monitoring policy; and sending the host information to the at least one of the plurality of hosts in the network.

12. The system of claim 9, wherein the virtual machine policy is used to determine the most likely virtual machine on the host to use a pre-determined amount of networking resources in a specified duration of time.

13. The system of claim 9, wherein determining the virtual machine to migrate comprises using an algorithm that takes into account predicted network resource demand of the plurality of virtual machines.

14. The system of claim 13, wherein the algorithm further takes into account at least one selected from a group consisting of time between migrations, the resource usage data for the virtual machine, and historical data of the plurality of potential target hosts denying migration requests.

15. The system of claim 13, wherein determining the virtual machine comprises using an algorithm that takes into account current network usage pattern of the host.

16. The system of claim 9, wherein the monitoring agent is associated with a first virtual network interface card (VNIC), wherein the virtual machine is associated with a second VNIC, wherein the first VNIC and second VNIC have distinct Internet Protocol (IP) addresses, and wherein the first VNIC and the second VNIC are located in the media access control (MAC) layer of the host.

17. A non-transitory computer readable medium comprising executable instructions executable by a processor to perform a method, the method comprising:

monitoring, by a monitoring agent operatively connected to a device driver, a plurality of potential target hosts in a network, wherein the device driver is executing on a host and is operatively connected to a network interface card and wherein the monitoring agent is executing on the host;

determining, by the host, a virtual machine of the plurality of virtual machines to be migrated based on a virtual machine policy, wherein the virtual machine is operatively connected to the device driver;

sending, by the host, a request to migrate the virtual machine to the plurality of potential target hosts in the network, wherein the request is sent to the plurality of potential target hosts using at least one selected from a group consisting of multicast messages and broadcast messages;

receiving an acceptance to the request to migrate the virtual machine from at least two of the plurality of potential target hosts;

determining, by the monitoring agent, a chosen target host to receive the virtual machine based on a migration policy, wherein the chosen target host is one of the at least two of the plurality of potential target hosts from which the acceptance was received;

sending, by the host, a confirmation message to the chosen target host;

sending, by the host, resource usage data for the virtual machine to the chosen target host, wherein the resource usage data for the virtual machine comprises at least one selected from a group consisting of a number of packets sent by the virtual machine over a period of time when the virtual machine was executing on the host and a number of packets received by the virtual machine over the period of time when the virtual machine was executing on the host wherein the chosen target host confirms readiness for migration upon receiving the resource usage data; and migrating the virtual machine to the chosen target host.

18. The computer readable medium of claim 17, wherein the virtual machine policy is used to determine the most likely virtual machine on the host to use maximum networking resources in a specified duration of time.

19. The computer readable medium of claim 17, wherein determining the virtual machine to migrate comprises using an algorithm that takes into account predicted network resource demand of the plurality of virtual machines and at least one selected from a group consisting of time between migrations and historical data of the plurality of potential target hosts denying migration requests.

20. The computer readable medium of claim 17, wherein the monitoring agent is associated with a first virtual network interface card (VNIC), wherein the virtual machine is associated with a second VNIC, wherein the first VNIC and second VNIC have distinct Internet Protocol (IP) addresses, and wherein the first VNIC and the second VNIC are located in the media access control (MAC) layer of the host.

\* \* \* \* \*